United States Patent Office 3,634,307
Patented Jan. 11, 1972

3,634,307
ORGANIC BINDER FOR FRICTION LINING
Henry C. Morton, East Greenbush, N.Y., assignor to
The Bendix Corporation
Continuation-in-part of application Ser. No. 610,397,
Jan. 19, 1967. This application Dec. 11, 1969, Ser.
No. 884,329
Int. Cl. C08g 51/10
U.S. Cl. 260—38
3 Claims

ABSTRACT OF THE DISCLOSURE

An organic binder for friction linings comprised of a nylon polyamide modified phenolic resin is herein disclosed. The polyamide is added as a reactant to the reaction mass during the phenolic resin forming process to provide the phenolic resin with a temperature resistant toughness and fade resistance.

CROSS REFERENCE TO RELATED APPLICATIONS

This case is a continuation-in-part of U.S. patent application Ser. No. 610,397, filed Jan. 19, 1967, now abandoned.

SUMMARY OF THE INVENTION

The present invention relates to an organic resin binder material for use in friction lining material in either clutch or brake applications.

Present clutch and brake linings of the primarily organic type under extreme conditions of usage exhibit a marked loss in co-efficient of friction or "fade" at elevated temperatures. They also tend to become structurally weaker as the temperature of the contacting surface rises to high levels, such as may be encountered under severe conditions. This condition is somewhat regenerative in a clutch, as the loss in friction or "fade" increases almost in direct proportion to the temperature rise inducing clutch slippage at a certain point. As slippage occurs, this further effect causes temperature to increase rapidly, thus resulting in still higher operating temperatures and further increased loss in frictional characteristics. In a rotating clutch or brake, the temperature rise weakens the binder compounds, and causes the friction material to disintegrate at relatively low r.p.m. due to the action of centrifugal forces.

It is an object of the present invention to provide an improved resin binder for friction linings which exhibits greater "fade" resistance and greater strength under severe temperature conditions.

It is another object of the present invention to provide a modified organic resin having a minor polyamide addition, such as "nylon" to a thermo-setting-aldehyde resin.

DETAILED DESCRIPTION

Figure 1:
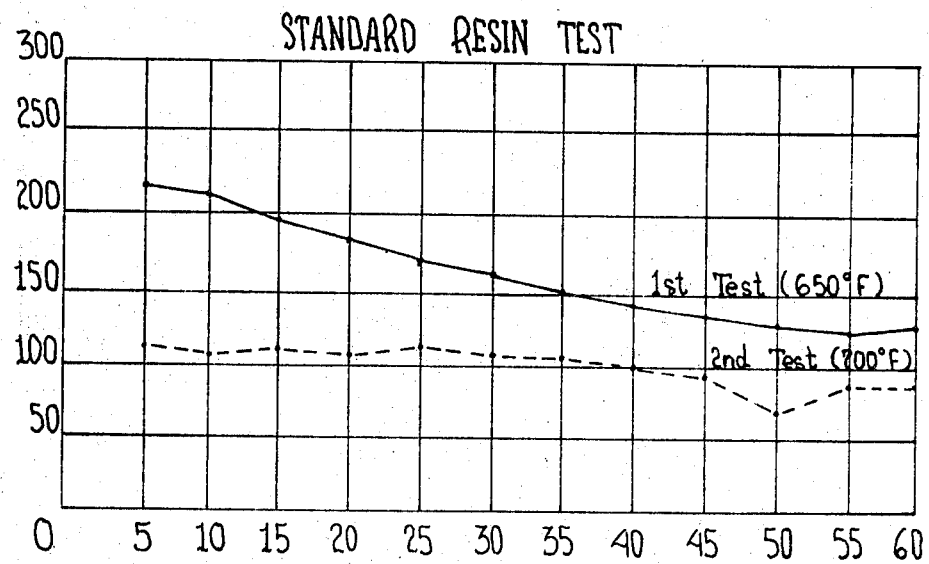
FIG. 1 is a first graph showing operating characteristics of a comparable unmodified known friction material.

Clutch and brake linings, particularly in passenger car and truck applications, are generally comprised of a thermosetting resin binder and certain filler, strength and/or friction producing additives. Clutches, may, for example, include loose woven cloth or yarn of asbestos and wire set in a resin binder. Brake linings will normally have such fillers as asbestos fiber and hard friction producing particles either organic or inorganic. In either case, the primary lining constituent is the resin binder, and its properties have the major effect on lining strength, and also contributes significantly to the "fade" problem. Current general practice is to utilize a thermosetting resin, for example phenol, cresol and/or xylenol formaldehyde partially polymerized in the presence of either an alkaline or acid catalyst. The partially cured resin is then shaped with the desired friction lining additives included and heat applied to complete the resin curing process forming a relatively strong finished article.

In the present invention, I have found that the addition of a minor amount of a polyamide, such as for example "nylon," as a reactant during the resin forming process produces a binder which, when used in friction linings, exhibits superior "fade" stability and greater strength than unmodified thermosetting resins. Inasmuch as the polyamides are basically high melting thermoplastic materials, the effect on the physical and chemical characteristics of the resin is quite marked when used as a modifying agent. Below 1% by weight compared to the phenol content of the resin, the effect on the physical and chemical characteristics of the resin is too little to be noticeable. Above 15%, the resin begins to assume the properties of a thermoplastic material with resultant loss in heat resistance and resiliency which is not desirable in a binder compound used to produce friction elements. The preferred amount of polyamide modification is from 5-10% by weight of the phenol, cresol and/or xylenol content of the binder.

The modified binder is effective to stabilize the frictional characteristics of friction facings at elevated temperature, and to enhance the tensile strength and toughness of the friction facing so that improved burst strengths are obtained when subject to high centrifugal forces.

In order to demonstrate elevated temperature, fade, and frictional characteristics, comparative fade tests were conducted on a dynamometer.

A standard clutch facing was first prepared using a binder prepared according to the teachings of the prior art. Cresol and formaldehyde were mixed in the presence of sulfuric acid for 16 minutes at 100° C. Additional formaldehyde was added to provide a cresol to formaldehyde molar ratio of 10 to 7.5 while the mixture was refluxed at atmospheric pressure and 100° C. temperature for three hours. Water was then drawn off by gradually elevating the temperature and reducing the pressure over a period of 215 minutes to an end point of 150° C. and 80 mm. of mercury. The resultant resin was then dropped on a cold surface, allowed to harden, and subsequently ground with hexamethylene tetramine in a ratio of 10:1. A resin slurry was then prepared, including rubber and friction modifying agents, and the clutch facing was fabricated by passing asbestos yarn through the slurry, forming the impregnated yarn into the desired shape and vulcanizing, under heat and pressure, to convert the resin into the thermoset state.

A fade test was then conducted on a dynamometer. In this test procedure, a conventional 10 inch clutch was utilized. The force used in the clutch represented a 750 lb. spring load when the clutch was fully engaged. With the clutch engaged, the clutch facings are allowed to slip against a fly wheel rotating at 1200 r.p.m. for 60 seconds, and the amount of torque delivered measured at 5 second intervals. After an initial 60 second slip test, the clutch assembly is allowed to cool for twenty minutes, and a second test run repeating the duration and torque measurement intervals of the first run.

Next, a friction facing was prepared to having a nylon polyamide modified binder in accord with the teachings of the present invention. In formulating the binder, five percent (5%) of nylon, based on the weight of the cresol content, was included with the initial cresol and formaldehyde. As with the prior art binder described above, the polyamide, cresol and formaldehyde were mixed for 16 minutes in the presence of sulfuric acid. Additional formaldehyde was added to provide the cresol to formaldehyde molar ratio of 10 to 7.5 while the mixture was refluxed at atmospheric pressure and a temperature of 100° C. for three hours. Water was then drawn off by gradually elevating the temperautre to an end point of 150° C. and decreasing pressure to an end point of 80 mm. of mercury. The resultant resin was then dropped on a cold surface, allowed to harden, and subsequently ground with hexamethylene tetramine in a ratio of 10:1. A resin slurry was then prepared including rubber and friction modifying agents as before. Processing of the clutch facing and fade testing of the modified binder facing were carried out as before. The recorded results of the fade test are entered in the table below for each of the two runs on a clutch facing with standard binder and two runs on a clutch facing with the modified binder.

TABLE I

| Time (seconds) | First run (torque ft./lbs.) | | Second run (torque ft./lbs.) | |
|---|---|---|---|---|
| | Standard | Modified | Standard | Modified |
| 5 | 216 | 192 | 116 | 164 |
| 10 | 212 | 184 | 108 | 168 |
| 15 | 196 | 188 | 112 | 192 |
| 20 | 180 | 192 | 112 | 192 |
| 25 | 172 | 188 | 116 | 176 |
| 30 | 164 | 188 | 112 | 160 |
| 35 | 152 | 180 | 108 | 144 |
| 40 | 144 | 172 | 100 | 128 |
| 45 | 140 | 168 | 96 | 116 |
| 50 | 136 | 156 | 72 | 116 |
| 55 | 132 | 152 | 88 | 120 |
| 60 | 132 | 148 | 88 | 128 |

Figure 2:
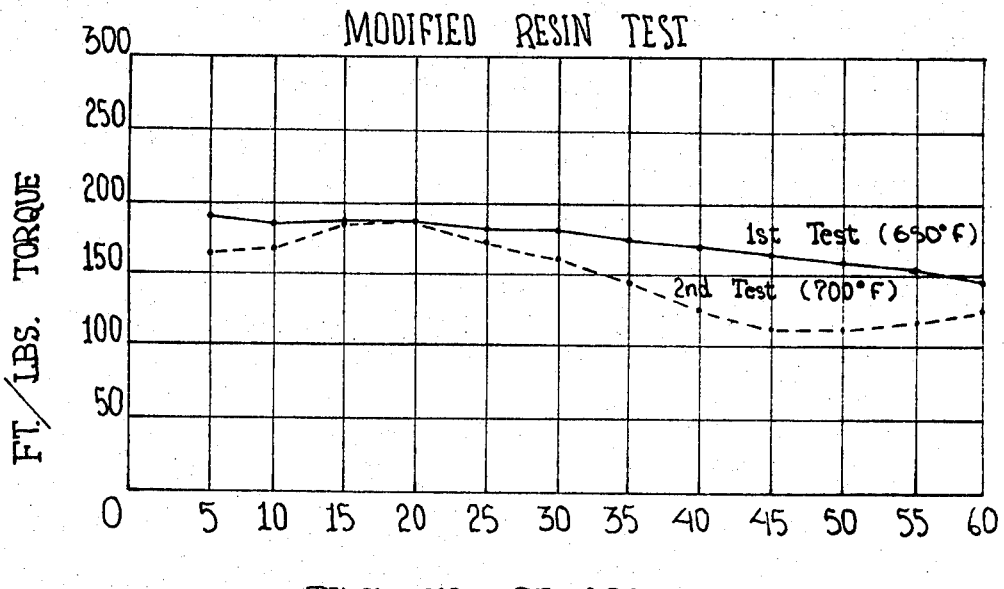
FIG. 2 is a second graph showing operating characteristics of a friction lining having a binder in accord with the teachings of this invention.

The results of tests on friction facing with standard binder are plotted on the graph of FIG. 1 and the modified binder results on FIG. 2.

Thermocouple readings taken at the conclusion of each 60 second test indicated a temperature of 650° F. at the conclusion of each first run, and 700° F. after each second run.

It will be noted, the polyamide modified binder, except for an initial burnish run, yielded higher friction values and sustained these values for a longer period of time than the facings made with unmodified resin.

I claim:
1. In a friction lining comprising a binder-treated asbestos the improvement wherein said binder is formed as the reaction product of formaldehyde, a phenolic material selected from the group consisting of phenol cresol, and xylenol, and nylon polyamide, said polyamide comprising from about 1% to about 15% by weight of the phenol, cresol, or xylenol content and the mole ratio of said phenolic material to said formaldehyde is of about 10 to 7.5 respectively.

2. The friction lining as claimed in claim 1 wherein said polyamide comprises less than about 10% by weight of the phenol, cresol or xylenol content.

3. The friction lining as claimed in claim 1 wherein said polyamide comprises more than about 5% by weight of the phenol, cresol, or xylenol content.

References Cited

UNITED STATES PATENTS

| 2,544,128 | 5/1951 | Spokes | 260—DIG 39 |
| 2,960,190 | 11/1960 | Holper | 260—DIG 39 |
| 3,014,886 | 12/1961 | Harding | 260—38 X |
| 3,259,670 | 7/1966 | Weltman et al. | 260—841 |

FOREIGN PATENTS

| 38/7,470 | 5/1963 | Japan | 260—DIG 39 |

LEWIS T. JACOBS, Primary Examiner

U.S. Cl. X.R.

260—841